United States Patent
Baehrle-Miller et al.

(10) Patent No.: US 10,246,070 B2
(45) Date of Patent: Apr. 2, 2019

(54) BRAKE SYSTEM CONTROL UNIT FOR A VEHICLE

(71) Applicant: Robert Bosch GmbH, Stuttgart (DE)

(72) Inventors: Frank Baehrle-Miller, Schoenaich (DE); Peter Rebholz-Goldmann, Neuenstadt (DE)

(73) Assignee: Robert Bosch GmbH, Stuttgart (DE)

( * ) Notice: Subject to any disclaimer, the term of this patent is extended or adjusted under 35 U.S.C. 154(b) by 10 days.

(21) Appl. No.: 15/709,513

(22) Filed: Sep. 20, 2017

(65) Prior Publication Data

US 2018/0079399 A1 Mar. 22, 2018

(30) Foreign Application Priority Data

Sep. 22, 2016 (DE) .................. 10 2016 218 214

(51) Int. Cl.
| | | |
|---|---|---|
| *B60T 13/66* | (2006.01) | |
| *B60T 7/04* | (2006.01) | |
| *B60T 8/171* | (2006.01) | |
| *B60T 13/74* | (2006.01) | |
| *B60T 13/58* | (2006.01) | |
| *B60T 17/22* | (2006.01) | |

(52) U.S. Cl.
CPC ............ *B60T 13/662* (2013.01); *B60T 7/042* (2013.01); *B60T 8/171* (2013.01); *B60T 13/588* (2013.01); *B60T 13/741* (2013.01); *B60T 13/746* (2013.01); *B60T 17/22* (2013.01); *B60T 2220/04* (2013.01); *B60T 2270/40* (2013.01)

(58) Field of Classification Search
CPC ...... B60T 13/662; B60T 17/22; B60T 13/588; B60T 13/746; B60T 8/171; B60T 7/042; B60T 13/741; B60T 2270/40; B60T 2220/04
USPC .......................................... 701/70
See application file for complete search history.

(56) References Cited

U.S. PATENT DOCUMENTS

2013/0282249 A1* 10/2013 Heise .................. B60T 7/042
701/70

FOREIGN PATENT DOCUMENTS

| DE | 102 11 280 A1 | 9/2003 | |
|---|---|---|---|
| DE | 10 348392 A1 * | 5/2005 | ............ B60T 13/746 |
| DE | 10 2014 204 287 A1 | 9/2015 | |
| DE | 10 2015 204 757 A1 | 9/2016 | |

OTHER PUBLICATIONS

Balazovic, Peter; "56F8300 Hybrid Controller Used in Control of Electro-Mechanical Brake", 2004, Freescale Semiconductor Inc; AN1999, Rev. 0, Nov. 2004.*

* cited by examiner

*Primary Examiner* — Brian P Sweeney
(74) *Attorney, Agent, or Firm* — Maginot, Moore & Beck LLP

(57) ABSTRACT

A brake system control unit for a vehicle having a hydraulic vehicle brake and electromechanical brake device comprises a microcontroller, a system ASIC and a brake motor ASIC, wherein the microcontroller is connected to the system ASIC and the brake motor ASIC via communication interfaces. In the brake motor ASIC, an interrogation signal sequence for interrogating the switched state of an actuation switch of the electromechanical brake device is generated.

12 Claims, 3 Drawing Sheets

BRAKE SYSTEM CONTROL UNIT FOR A VEHICLE

This application claims priority under 35 U.S.C. § 119 to application no. DE 10 2016 218 214.5, filed on Sep. 22, 2016 in Germany, the disclosure of which is incorporated herein by reference in its entirety.

BACKGROUND

The disclosure relates to a brake system control unit for a vehicle having a hydraulic vehicle brake and having an electromechanical brake device which comprises at least one electric brake motor.

DE 10 2014 204 287 A1 describes a brake system control unit for a vehicle which is equipped with a hydraulic vehicle brake and an electromechanical parking brake with two electric brake motors on the wheels of the rear axle. The brake system can be actuated by means of the control unit in such a way that in a normal operating mode the electric brake motors can be actuated automatically, for example to carry out a parking process. In contrast, in a safety operating mode activation of the electric brake motors is prevented. The safety operating mode is set during the normal driving mode in order to prevent the parking brake from being activated inadvertently during travel.

SUMMARY

The brake system control unit according to the disclosure can be used in vehicles having a brake system which comprises a hydraulic vehicle brake and an electromechanical brake device with at least one electric brake motor, for example two electric brake motors. The control unit comprises a microcontroller by means of which at least one active brake component, preferably a plurality thereof, can be actuated, this/these being, for example, an electrically controllable actuator for influencing the hydraulic pressure in the hydraulic vehicle brake. Furthermore, the control unit comprises a system ASIC (application specific integrated circuit) for acquiring sensor signals of the vehicle, which signals can be fed to the microcontroller. Furthermore, the control unit comprises a brake motor ASIC which is embodied separately from the system ASIC and has the purpose of actuating the at least one electric brake motor of the electromechanical brake device. Sensor signals can also be acquired in the microcontroller ASIC. The brake motor is connected both to the system ASIC and to the brake motor ASIC via communication interfaces.

In the brake motor ASIC, an interrogation signal sequence can be generated which is fed to an actuation switch of the electromechanical brake device in order to interrogate the current switched state. Via the actuation switch, the driver in the vehicle can actuate manually the electromechanical brake device and optionally apply it in order to generate electromechanical braking force, or open it or switch it off in order to cancel the electromechanical braking force. In the brake motor ASIC, a sequence of individual signals are generated which are fed as an interrogation signal sequence to the actuation switch. In the actuation switch, a response signal sequence is generated as a function of the switched state and in reaction to the interrogation signal sequence, said response signal sequence being fed to the brake motor ASIC for evaluation. The response signal sequence contains the information about the current switched state of the actuation switch. Therefore, the information about the current switched state of the actuation switch is available to the brake motor ASIC and the electric brake motor can be actuated in accordance with the switched state.

It is advantageous that owing to the signal interrogation in the brake motor ASIC there is independence from the other components of the control unit. In the event of a failure of a component of the control unit—the microcontroller, the system ASIC or a communication interface between the microcontroller and the system ASIC or between the microcontroller and the brake motor ASIC—the electric brake motor can nevertheless be actuated by means of the brake motor ASIC in accordance with the current switch position of the actuation switch.

This makes it possible, on the one hand, to use the electromechanical brake device in a customary fashion as a parking brake even if a component of the control unit such as, for example, the microcontroller fails. The driver can actuate the electric brake motor of the electromechanical brake device by actuating the actuation switch.

A further advantage is that the electric brake motor can also be actuated by means of the brake motor ASIC independently of the driver, for example during a braking process for braking the vehicle during travel. If, for example, the microcontroller fails, this can no longer actuate an active brake component in the hydraulic vehicle brake, for example a hydraulic pump, with which the hydraulic brake pressure can be influenced. In the event of a failure of the microcontroller, this function can be assumed by the electric brake motor, which actuates the electric brake motor independently of the driver and independently of the current switched state of the actuation switch, in order to compensate the failure of the actuator in the hydraulic vehicle brake partially or completely and to generate an electromechanical braking force. If appropriate, pedal travel information of the brake pedal can be evaluated in order to actuate the electric brake motor as a function of the brake pedal position. The pedal travel information is also advantageously fed to the brake motor ASIC.

The interrogation signal sequence in the brake motor ASIC is advantageously generated continuously at cyclical intervals and fed to the actuation switch in order to interrogate the switched state. In the actuation switch, a response signal sequence is generated at each interrogation and fed to the brake motor ASIC again.

According to a further advantageous embodiment, in the event of a fault of the control unit—in the event of a failure of the microcontroller, of the system ASIC and/or of a communication interface between the microcontroller and the system ASIC or between the microcontroller and the brake motor ASIC—the electric brake motor is actuated in order to generate a braking force until the motor brake current of the electric brake motor reaches a defined maximum. The motor brake current of the electric brake motor correlates with the electromechanically generated braking force, with the result that the electromechanical braking force can be inferred directly from the motor brake current. When a maximum current is reached, a maximum braking force is also reached, said maximum braking force satisfying sufficient safety for parking purposes when the vehicle is parked.

According to a further advantageous embodiment, in the event of a fault the electric brake motor is actuated for a defined time period by means of the brake motor ASIC in order to generate an electromechanical braking force. After expiry of the time period, the electric brake motor is switched off by the brake motor ASIC, wherein the braking force which is obtained is maintained so that when the vehicle is parked the self-locking of the brake motor ensures continuous sufficient parking braking force even when the electric brake motor is switched off.

The electromechanical brake device is preferably integrated into one or more wheel brake devices of the hydraulic vehicle brake. In this embodiment, the brake piston in the wheel brake device can be adjusted in the direction of the brake disk either by hydraulic brake fluid of the hydraulic vehicle brake or by the electric brake motor, simultaneously or independently of one another. According to one advantageous embodiment, the electromechanical brake device respectively comprises an electric brake motor on the two wheel brake devices on the rear axle of the vehicle.

According to another advantageous embodiment, wheel rotational speed signals are acquired and processed in the system ASIC and made available as speed information to the microcontroller via the communication interface. Wheel rotational speed signals can also be acquired and processed in the brake motor ASIC. This embodiment permits, in the event of a failure of the microcontroller, of the system ASIC and/or of a communication interface between the microcontroller and the system ASIC or between the microcontroller and the brake motor ASIC, the electric brake motor of the electromechanical brake device to be actuated by means of the brake motor ASIC, automatically or on request by the driver, and to generate a braking force in an electromechanical manner The braking force can be generated both during a normal braking process as well as to park the vehicle.

According to a further advantageous embodiment, the wheel rotational speed signals in the system ASIC and the wheel rotational speed signals in the brake motor ASIC relate to different vehicle wheels. The wheel rotational speed signals of, in each case, two wheel rotational speed sensors are advantageously processed in each ASIC. For example the wheel rotational speed signals of sensors on the front wheels can be processed in the system ASIC, and the wheel rotational speed signals of sensors on the rear wheels can be processed in the brake motor ASIC. Dividing the wheel rotational speed signals between the two ASICs permits the brake motor to be actuated automatically as a function of the speed means of the brake motor ASIC even in the event of a failure, for example of the microcontroller.

According to yet a further advantageous embodiment, the brake motor ASIC contains at least one electronic H bridge for actuating the electric brake motor. In a preferred embodiment, the brake motor ASIC has a number of electronic H bridges corresponding to the number of electric brake motors. An electric brake motor can therefore be actuated by means of the brake motor ASIC, via one H bridge in each case. Via the H bridge it is possible to actuate the respective electric brake motor in both directions, with the result that by means of the brake motor ASIC it is possible both to apply the brake motor in order to generate electromechanical braking force and to release the brake motor in order to cancel the electromechanical braking force. The H bridge can also be switched to a neutral position in which the assigned brake motor is switched off.

According to yet a further expedient embodiment, the brake motor ASIC has a logic unit for acquiring the switched state of an actuation switch by means of which the electromechanical brake device can be switched on and off manually by the driver. The current switched state can be acquired by means of the logic unit. Furthermore, the communication interface for communication with the microcontroller also advantageously runs via the logic unit, and the logic unit forms a component of the communication interface to the microcontroller.

According to yet a further advantageous embodiment, in addition to the speed signals, motor rotational position signals of the electric brake motor are also processed in the system ASIC. The motor rotational position signals originate from a motor rotational position sensor, for example a Hall sensor for determining the current rotational position of the rotor shaft of the electric brake motor. In the case of a plurality of electric brake motors, a plurality of motor rotational position signals are correspondingly fed to the system ASIC. The motor rotational position signals can be used for variable actuation of the electric brake motors in the microcontroller, for example by means of PWM actuation.

In an alternative embodiment, motor rotational position signals are dispensed with; in this case the actuation advantageously takes place continuously or quasi-continuously.

The logic unit in the brake motor ASIC can be configured in such a way that in the event of a failure of the microcontroller or in the event of a partial failure of the wheel rotational speed signals the vehicle is decelerated or a parking braking force is generated in the vehicle by actuating the electric brake motor. In this context, a braking strategy which is adapted to the respective deceleration request can be implemented on the basis of the measured motor current in the electric brake motor. For example, the increase in the motor current which is associated with the build up of force for the parking brake function and the permanent provision of a parking braking force which secures the vehicle, subsequent to the switch-on peak of the motor current and the subsequent open-circuit current can be determined, and the electric brake motor can be temporarily switched off in order to implement an electromechanical braking force which increases in a step form, wherein owing to the self-locking the braking force is retained. The brake motor is then switched on again until the next force step is reached. This procedure is repeated until the parking braking force which is necessary to secure the motor vehicle in the stationary state is reached in step stages. If appropriate, a PWM actuation can take place in which the increase in current which is responsible for the height of the step stages in the braking force profile is set.

Furthermore, it is also possible to set a slip-dependent deceleration by correspondingly actuating the electric brake motor. In this context, the various wheel speeds are compared with one another. If a maximum slip is exceeded, the electric brake motor is opened again until a lower slip threshold is reached. If, on the other hand, the slip is too low, the electric brake motor is actuated in the application direction in order to increase the braking force.

In the method for operating the brake system control unit, the actuation of preferably all the active brake components takes place by means of the microcontroller by correspondingly generating control signals in the normal mode, with a functionally capable microcontroller. If, for example, a parking braking force is to be generated by means of the electric brake motor, the microcontroller generates control signals which are fed via the communication interface to the brake motor ASIC in which the electric brake motor is correspondingly actuated.

In contrast, in the event of a failure of the microcontroller or of a further component of the control unit with the exception of the brake motor ASIC, the electric brake motor is automatically actuated in the brake motor ASIC in order to generate a braking force. This takes place, in particular, as a function of the current brake pedal position, for which the pedal travel encoder signals which are present in the brake motor ASIC are processed.

BRIEF DESCRIPTION OF THE DRAWINGS

Further features and expedient embodiments can be found in the description of the figures and the drawings. In the drawings.

DETAILED DESCRIPTION

In the figures, identical components are provided with identical reference symbols.

Figure 1:
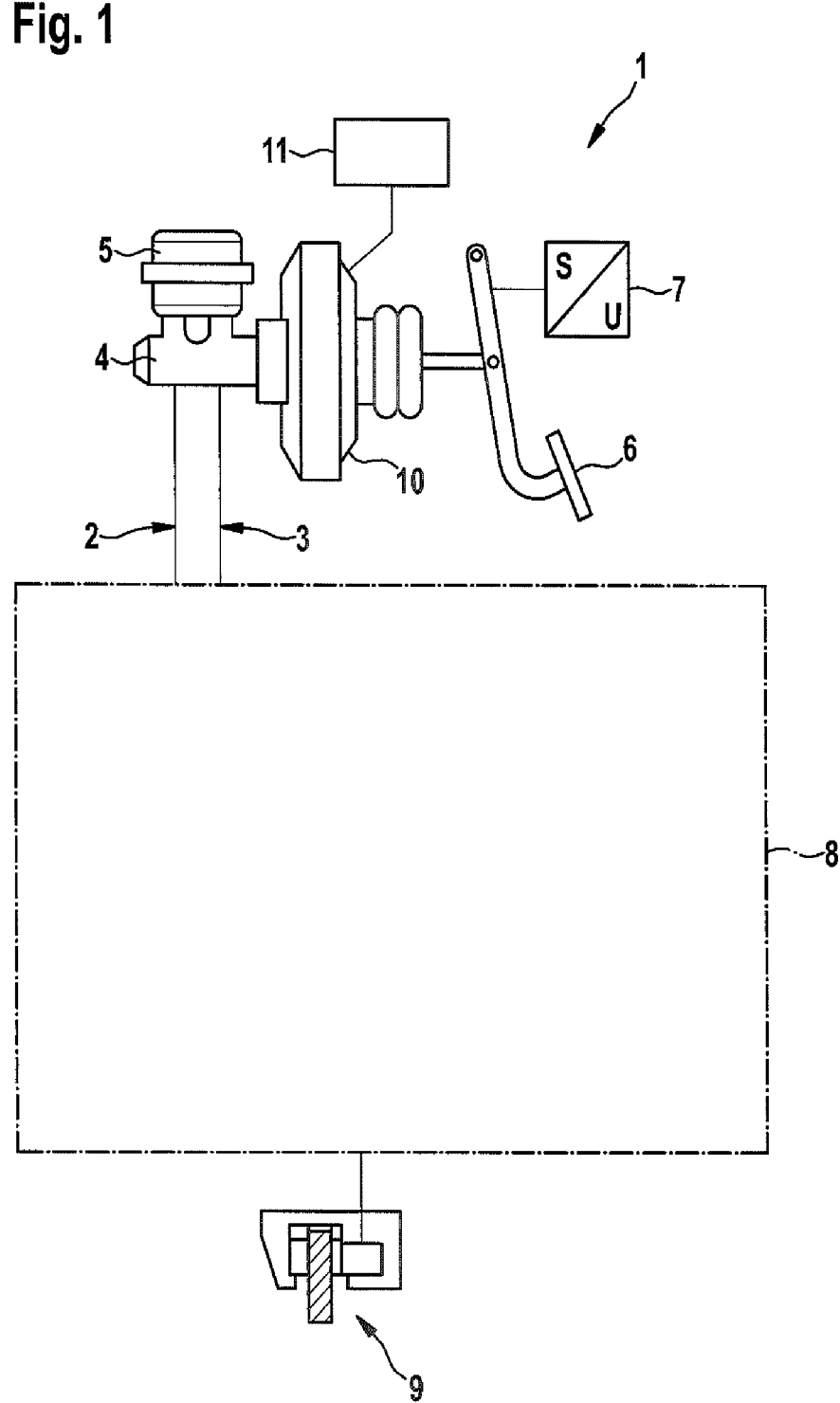
FIG. 1 shows a schematic illustration of a hydraulic vehicle brake with a brake booster, wherein the wheel brake devices of the vehicle brake on the rear axle of the vehicle are additionally equipped with an electromechanical brake device with an electric brake motor.

The hydraulic vehicle brake 1 illustrated in FIG. 1 for a vehicle comprises a front axle brake circuit 2 and a rear axle brake circuit 3 for supplying and actuating wheel brake devices 9 on each wheel of the vehicle with a brake fluid which is under hydraulic pressure. The brake circuits can also be embodied as two diagonal brake circuits, each with a front wheel and a rear wheel which is arranged diagonally with respect thereto.

The two brake circuits 2, 3 are connected to a common master brake cylinder 4 which is supplied with a brake fluid via a brake fluid reservoir container 5. The master brake cylinder piston within the master brake cylinder 4 is actuated by the driver by means of the brake pedal 6, and the pedal travel which is exerted by the driver is measured by means of a pedal travel sensor 7. Between the brake pedal 6 and the master brake cylinder 4 there is a brake booster 10 which comprises, for example, an electric motor which preferably actuates the master brake cylinder 4 (iBooster) via a transmission. The brake booster 10 constitutes an active brake component for influencing the hydraulic brake pressure.

The actuation movement of the brake pedal 6 which is measured by the pedal travel sensor 7 is communicated as a sensor signal to a control unit 11 of the brake system in which actuation signals for actuating the brake booster 10 are generated. The supply of the wheel brake devices 9 with brake fluid is carried out in each brake circuit 2, 3 by means of various switching valves which, together with further assemblies, are part of a brake hydraulic system 8. The brake hydraulic system 8 also includes a hydraulic pump which is a component of an electronic stability program (ESP). The hydraulic pump is also an active brake component for influencing the hydraulic brake pressure.

Figure 2:
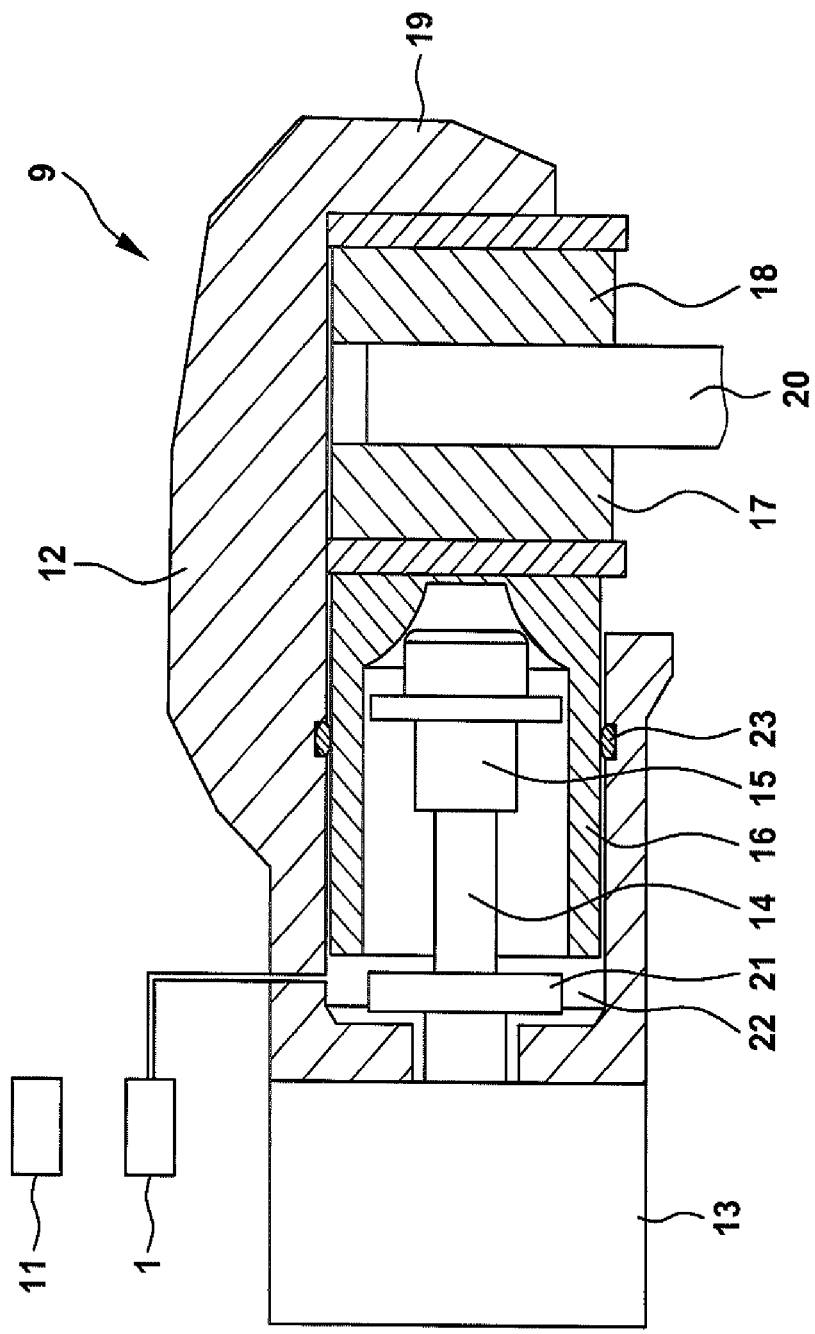
FIG. 2 shows a section through an electromechanical brake device with an electric brake motor.

FIG. 2 illustrates in detail the wheel brake device 9 which is arranged on a wheel on the rear axle of the vehicle. The wheel brake device 9 is part of the hydraulic vehicle brake 1 and is supplied with brake fluid 22 from the rear axle brake circuit. The wheel brake device 9 further has an electromechanical brake device which is preferably used in the stationary state as a parking brake for securing a vehicle, but can also be used during transport of the vehicle for braking the vehicle, in particular at relatively low vehicle speeds below a speed limiting value.

The electromechanical brake device comprises a brake caliper 12 with a caliper 19 which engages over a brake disk 20. The brake device has, as an actuator element, a motor-transmission unit with a DC electric motor as a brake motor 13, the rotor shaft of which drives a spindle 14 in rotation, on which spindle 14 a spindle nut 15 is mounted in a rotationally fixed fashion. In the case of a rotation of the spindle 14, the spindle nut 15 is adjusted axially. The spindle nut 15 moves within a brake piston 16 which is a carrier of a brake lining 17 which is pressed against the brake disk 20 by the brake piston 16. On the opposite side of the brake disk 20 there is a further brake lining 18 which is fastened to the caliper 19 in a positionally fixed fashion. The brake piston 16 is sealed in a pressure-tight fashion with respect to the receiving housing on its outer side via a circumferential sealing ring 23.

Within the brake piston 16, the spindle nut 15 can move axially forward in the direction of the brake disk 20 in the case of a rotational movement of the spindle 14 or axially rearward in the case of an opposing rotational movement of the spindle 14, until an end stop 21 is reached. In order to generate a clamping force, the spindle nut 15 acts on the inner end side of the brake piston 16 as a result of which the brake piston 16 which is mounted in an axially displaceable fashion in the brake device is pressed with the brake lining 17 against the facing end face of the brake disk 20. The spindle nut 15 constitutes a transmission element between the brake motor and the brake piston.

For the hydraulic braking force, the hydraulic pressure of the brake fluid 22 from the hydraulic vehicle brake 1 acts on the brake piston 16. The hydraulic pressure can also be effective in a supporting fashion in the stationary state of the vehicle when the electromechanical brake device is actuated, with the result that the total braking force is composed of the portion which is provided by electric motor and the hydraulic portion. During the travel of the vehicle, either only the hydraulic vehicle brake is active or both the hydraulic vehicle brake and the electromechanical brake device or only the electromechanical brake device is active, in order to generate braking force. The actuation signals for actuating both the adjustable components of the hydraulic vehicle brake 1 and the electromechanical wheel brake device 9 are generated in the control unit 11.

Figure 3:
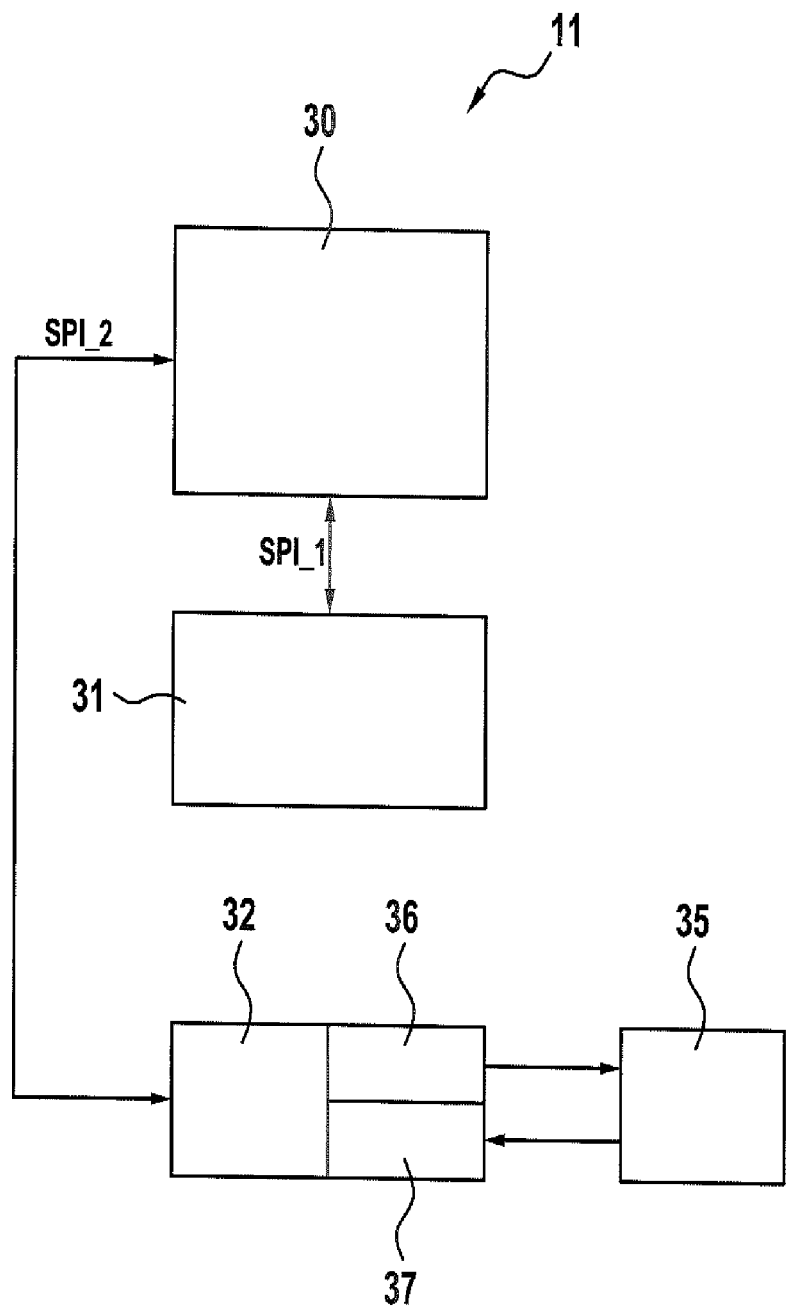
FIG. 3 shows a functional diagram of a control unit of the brake system with a hydraulic vehicle brake and an electromechanical brake device.

FIG. 3 illustrates a functional diagram of the control unit 11 which comprises a microcontroller 30, a system ASIC 31 and a brake motor ASIC 32. The microcontroller is connected to the system ASIC 31 via a communication interface SPI_1, and to the brake motor ASIC 32 via a further communication interface SPI_2.

Wheel rotational speed signals which originate from wheel rotational speed sensors on two wheels of the vehicle can be received and conditioned in the system ASIC 31.

Likewise, if appropriate motor rotational position signals from Hall sensors on the two electric brake motors of the electromechanical brake device can be received and processed in the system ASIC 31. The processed wheel rotational speed signals and the processed motor rotational position signals are made available to the microcontroller 30.

The brake motor ASIC 32 communicates with the microcontroller 30 via the communication interface SPI_2. Further wheel rotational speed signals, which originate from wheel rotational speed sensors on other vehicle wheels, can received and processed in the brake motor ASIC 32. For example, the wheel rotational speed signals in the system ASIC 31 relate to the front wheels, and the wheel rotational speed signals in the brake motor ASIC relate to the rear wheels of the vehicle. The processed wheel rotational speed signals are made available to the microcontroller 30 by the brake motor ASIC 32.

The brake motor ASIC 32 can further include, as electronic circuits, H bridges which are each assigned to an electric brake motor of the electromechanical brake device. The H bridges are actuated by means of the brake motor ASIC 32 and regulate the functions of the electric brake motors which, depending on the actuation, are applied in order to generate a braking force or opened or switched off in order to cancel a braking force.

In the brake motor ASIC 32, an interrogation signal sequence 36 is generated regularly and at cyclical intervals, said interrogation signal sequence 36 being fed to the actuation switch 35 by means of which the electromechanical brake device with the electric brake motors is either switched on to generate a braking force in the application direction or switched on or switched off in order to release the breaking force. One of these current switched states of the actuation switch 35 can be interrogated by means of the interrogation signal sequence 36.

For this, the interrogation signal sequence 36 is fed to the actuation switch 35 which, depending on the current switched state, generates as a response to the interrogation signal sequence 36 a response signal sequence 37 and sends this back to the brake motor ASIC. The response signal sequence 37 accordingly contains the information about the current switched state of the actuation switch 35. In the brake motor ASIC, the electric brake motor is then actuated, or if appropriate switched off, as a function of the switched state. The actuation or switching off of the electric brake motor takes place independently of the microcontroller 30, of the system ASIC 31, and one of the communication interfaces SPI_1 and SPI_2. It is therefore possible to actuate and switch off the electric brake motor even in the event of a failure of one of the abovementioned components in the control unit 11.

What is claimed is:

1. A brake system control unit for a vehicle having a hydraulic vehicle brake and an electromechanical brake device including at least one electric brake motor, the brake system control unit comprising:
   a microcontroller configured to actuate at least one active brake component;
   a system ASIC configured to acquire sensor signals; and
   a brake motor ASIC configured to acquire sensor signals, the brake motor ASIC being configured to generate an interrogation signal sequence configured to interrogate a switched state of an actuation switch of the electromechanical brake device,
   wherein the actuation switch of the electromechanical brake device is configured to generate a response signal sequence as a function of the switched state and in reaction to the interrogation signal sequence, the response signal sequence being fed to the brake motor ASIC for evaluation,
   wherein the microcontroller is connected to the system ASIC and the brake motor ASIC via communication interfaces.

2. The brake motor control unit according to claim 1, wherein the system ASIC is configured to acquire wheel rotational speed signals.

3. The brake motor control unit according to claim 1, wherein the brake motor ASIC is configured to acquire wheel rotational speed signals.

4. The brake motor control unit according to claim 1, wherein the system ASIC and the brake motor ASIC are each configured to acquire pedal travel encoder signals of a brake pedal.

5. A method for operating a brake system control unit for a vehicle having a hydraulic vehicle brake and an electromechanical brake device including at least one electric brake motor, the brake system control unit including (i) a microcontroller configured to actuate at least one active brake component, (ii) a system ASIC configured to acquire sensor signals, and (iii) a brake motor ASIC configured to acquire sensor signals, the microcontroller is being connected to the system ASIC and the brake motor ASIC via communication interfaces, the method comprising:
   generating, with the brake motor ASIC, an interrogation signal sequence configured to interrogate a switched state of an actuation switch of the electromechanical brake device, the actuation switch of the electromechanical brake device being configured to generate a response signal sequence as a function of the switched state and in reaction to the interrogation signal sequence, the response signal sequence being fed to the brake motor ASIC for evaluation; and
   generating a braking force, in response to one of (i) a failure of the microcontroller, (ii) a failure of the system ASIC, and (iii) a failure of one of the communication interfaces, by actuating the electric brake motor as a function of the switched state of the actuation switch of the electromechanical brake device using the brake motor ASIC.

6. The method according to claim 5 further comprising:
   feeding, continuously and at cyclical intervals, the interrogation signal sequence to the actuation switch of the electromechanical brake device.

7. The method according to claim 5 further comprising:
   generating the braking force, in response to the one of (i) the failure of the microcontroller, (ii) the failure of the system ASIC, and (iii) the failure of one of the communication interfaces, by actuating the electric brake motor until a motor brake current of the electric brake motor reaches a defined maximum using the brake motor ASIC.

8. The method according to claim 5 further comprising:
   generating the braking force, in response to the one of (i) the failure of the microcontroller, (ii) the failure of the system ASIC, and (iii) the failure of one of the communication interfaces, by actuating the electric brake motor for a defined time period using the brake motor ASIC.

9. A brake system for a vehicle, the brake system comprising:
   a hydraulic vehicle brake;
   an electromechanical brake device including at least one electric brake motor and an actuation switch; and
   a brake system control unit configured to actuate adjustable brake system components of the brake system, the brake system control unit comprising:
   a microcontroller configured to actuate at least one active brake component;
   a system ASIC configured to acquire sensor signals; and
   a brake motor ASIC configured to acquire sensor signals, the brake motor ASIC being configured to generate an interrogation signal sequence configured to interrogate a switched state of the actuation switch of the electromechanical brake device,
   wherein the actuation switch of the electromechanical brake device is configured to generate a response signal sequence as a function of the switched state and in reaction to the interrogation signal sequence, the response signal sequence being fed to the brake motor ASIC for evaluation, wherein the microcontroller is connected to the system ASIC and the brake motor ASIC via communication interfaces.

10. The brake system according to claim 9, wherein the hydraulic vehicle brake includes an electrically controllable actuator configured to influence a hydraulic pressure.

11. The brake system according to claim 9, wherein wheel brake devices on a rear axle of the vehicle include the at least one electric brake motor.

12. The brake system according to claim 9, wherein the brake system is included in the vehicle.

* * * * *